United States Patent
Tsai et al.

(10) Patent No.: US 12,185,409 B2
(45) Date of Patent: Dec. 31, 2024

(54) METHOD AND USER EQUIPMENT FOR HYBRID AUTOMATIC REPEAT REQUEST PROCESS OPERATION IN NON-TERRESTRIAL NETWORK

(71) Applicant: SHARP KABUSHIKI KAISHA, Sakai (HK)

(72) Inventors: Hsin-Hsi Tsai, Taipei (TW); Chien-Chun Cheng, Taipei (TW); Heng-Li Chin, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 156 days.

(21) Appl. No.: 17/470,323

(22) Filed: Sep. 9, 2021

(65) Prior Publication Data

US 2022/0078881 A1    Mar. 10, 2022

Related U.S. Application Data

(60) Provisional application No. 63/076,299, filed on Sep. 9, 2020, provisional application No. 63/076,303, filed on Sep. 9, 2020.

(51) Int. Cl.
*H04W 76/28*    (2018.01)
*H04L 1/1812*    (2023.01)
(Continued)

(52) U.S. Cl.
CPC ........... *H04W 76/28* (2018.02); *H04L 1/1819* (2013.01); *H04L 1/1896* (2013.01); *H04W 72/23* (2023.01); *H04W 84/06* (2013.01)

(58) Field of Classification Search
CPC ..... H04W 76/28; H04W 72/23; H04W 84/06; H04L 1/1819; H04L 1/1896; H04L 1/1822; H04L 1/188
See application file for complete search history.

(56) References Cited

U.S. PATENT DOCUMENTS

2020/0128574 A1    4/2020    Suzuki et al.
2022/0312480 A1*   9/2022    Babaei ............... H04L 1/1835

FOREIGN PATENT DOCUMENTS

CN    109245866 A    1/2019
CN    110651496 A    1/2020
(Continued)

OTHER PUBLICATIONS

Machine translated version of WO 2022/082353 A1 retrieved from PE2E on May 2, 2024 (Year: 2022).*

(Continued)

*Primary Examiner* — Charles C Jiang
*Assistant Examiner* — Rachel Elizabeth Marks
(74) *Attorney, Agent, or Firm* — ScienBiziP, P.C.

(57) ABSTRACT

A method and a user equipment are provided. The method includes: receiving a Discontinuous Reception (DRX) configuration, the DRX configuration including a first DRX timer and a second DRX timer; receiving a first Hybrid Automatic Repeat Request (HARQ) configuration, the first HARQ configuration indicating a first state of a first HARQ process; receiving a second HARQ configuration, the second HARQ configuration indicating a second state of a second HARQ process; performing a Downlink (DL) transmission using the first HARQ process; determining whether to start the first DRX timer for the first HARQ process after the DL transmission based on the first state indicated by the first HARQ configuration; performing an Uplink (UL) transmission using the second HARQ process; and determining whether to start the second DRX timer for the second HARQ process after the UL transmission based on the second state indicated by the second HARQ configuration.

8 Claims, 5 Drawing Sheets

(51) Int. Cl.
  *H04L 1/1867* (2023.01)
  *H04W 72/23* (2023.01)
  *H04W 84/06* (2009.01)

(56) References Cited

FOREIGN PATENT DOCUMENTS

| WO | 2020/029787 A1 | 2/2020 | |
|---|---|---|---|
| WO | WO-2020089858 A1 * | 5/2020 | ............... H04L 1/08 |
| WO | WO-2022082353 A1 * | 4/2022 | ........... H04L 1/1848 |

OTHER PUBLICATIONS

Interdigital, 3GPP RAN WG2 Meeting #111e 8.10.2.1 Summary of [AT111][107][NTN] Pre-compensation and other MAC issues (Year: 2020).*

3GPP TS 38.213, "3rd Generation Partnership Project; Technical Specification Group Radio Access Network; NR; Physical layer procedures for control (Release 16)", Technical Specification, V16.2.0 (Jun. 2020).

3GPP TS 38.300, "3rd Generation Partnership Project; Technical Specification Group Radio Access Network; NR; NR and NG-RAN Overall Description; Stage 2 (Release 16)", Technical Specification, V16.2.0 (Jul. 2020).

3GPP TS 38.321, "3rd Generation Partnership Project; Technical Specification Group Radio Access Network; NR; Medium Access Control (MAC) protocol specification (Release 16)", Technical Specification, V16.1.0 (Jul. 2020).

3GPP TR 38.821, "3rd Generation Partnership Project; Technical Specification Group Radio Access Network; Solutions for NR to support non-terrestrial networks (NTN) (Release 16)", Technical Report, V16.0.0 (Dec. 2019).

3GPP TS 38.211, "3rd Generation Partnership Project; Technical Specification Group Radio Access Network; NR; Physical channels and modulation (Release 16)", Technical Specification, V16.2.0 (Jun. 2020).

Nomor Research GmbH, Thales, "Enhancements for NTN on MAC Layer—Impact Analysis on TS", R2-2006702, 3GPP TSG-RAN WG2 #111-e, e-Meeting, Aug. 17-28, 2020.

InterDigital (email discussion Rapporteur), "Summary of [AT111][107][NTN] Pre-compensation and other MAC issues", R2-2008188, 3GPP RAN WG2 Meeting #111e, Aug. 17-28, 2020.

3rd Generation Partnership Project, Technical Specification Group Radio Access Network, NR, Medium Access Control (MAC) protocol specification, (Release 15), 3GPP TS 38.321 V15.8.0 (Dec. 2019).

Interdigital: "Summary of MAC open issues in NTN", R2-2007615, 3GPP RAN WG2 Meeting #111e, Aug. 17-28, 2020 (Aug. 7, 2020).

Ericsson et al: "DRX adaptions for NTN", R2-1915566, 3GPP TSG-RAN WG2 #108, Reno, Nevada, US, Nov. 18-22, 2019 (Nov. 7, 2019).

ZTE Corporation et al: "Further consideration on MAC enhancements", R2-1913083, 3GPP TSG RAN WG2 Meeting #107bis, Chongqing, China, Oct. 14-18, 2019 (Oct. 4, 2019).

* cited by examiner

METHOD AND USER EQUIPMENT FOR HYBRID AUTOMATIC REPEAT REQUEST PROCESS OPERATION IN NON-TERRESTRIAL NETWORK

CROSS-REFERENCE TO RELATED APPLICATIONS

The present disclosure claims the benefit of and priority to U.S. Provisional Patent Application Ser. No. 63/076,303, filed on Sep. 9, 2020, entitled "OPERATIONS FOR DISABLING HARQ FEEDBACK" ("the '303 provisional") and U.S. Provisional Patent Application Ser. No. 63/076,299, filed on Sep. 9, 2020, entitled "HARQ PROCESS ID SELECTION" ("the '299 provisional"). The contents of the '303 provisional and the '299 provisional are hereby incorporated fully by reference into the present disclosure for all purposes.

FIELD

The present disclosure is related to wireless communication, and more particularly, to a method and a user equipment (UE) for hybrid automatic repeat request (HARQ) process operation in a non-terrestrial network (NTN) in next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for hybrid automatic repeat request (HARQ) process operation in non-terrestrial network (NTN) in the next generation wireless communication networks.

In a first aspect of the present disclosure, a method performed by a user equipment (UE) is provided. The method includes: receiving a Discontinuous Reception (DRX) configuration from a Base Station (BS), the DRX configuration including a first DRX timer and a second DRX timer; receiving a first Hybrid Automatic Repeat Request (HARQ) configuration from the BS, the first HARQ configuration indicating a first state of a first HARQ process; receiving a second HARQ configuration from the BS, the second HARQ configuration indicating a second state of a second HARQ process; performing a Downlink (DL) transmission using the first HARQ process; determining whether to start the first DRX timer for the first HARQ process after the DL transmission based on the first state indicated by the first HARQ configuration; performing an Uplink (UL) transmission using the second HARQ process; and determining whether to start the second DRX timer for the second HARQ process after the UL transmission based on the second state indicated by the second HARQ configuration.

In an implementation of the first aspect of the present disclosure, the first state indicates whether HARQ feedback for the first HARQ process is disabled.

In an implementation of the first aspect of the present disclosure, the second state indicates whether HARQ retransmission for the second HARQ process is disabled.

In an implementation of the first aspect of the present disclosure, the method further includes: starting the first DRX timer for the first HARQ process after the DL transmission in a case that the first state indicates that HARQ feedback for the first HARQ process is not disabled; and not starting the first DRX timer for the first HARQ process after the DL transmission in a case that the first state indicates that the HARQ feedback for the first HARQ process is disabled.

In an implementation of the first aspect of the present disclosure, the method further includes: starting the second DRX timer for the second HARQ process after the UL transmission in a case that the second state indicates that HARQ retransmission for the second HARQ process is not disabled; and not starting the second DRX timer for the second HARQ process after the UL transmission in a case that the second state indicates that the HARQ retransmission for the second HARQ process is disabled.

In an implementation of the first aspect of the present disclosure, the first DRX timer is a DRX HARQ Round-Trip Time (RTT) timer for DL.

In an implementation of the first aspect of the present disclosure, the second DRX timer is a DRX HARQ Round-Trip Time (RTT) timer for UL.

In an implementation of the first aspect of the present disclosure, the DL transmission is scheduled by a Physical Downlink Control Channel (PDCCH) or configured by a configured DL assignment.

In an implementation of the first aspect of the present disclosure, the UL transmission is scheduled by a Physical Downlink Control Channel (PDCCH) or configured by a configured UL grant.

In an implementation of the first aspect of the present disclosure, the first HARQ configuration and the second HARQ configuration are configured by a Radio Resource Control (RRC) message.

In a second aspect of the present disclosure, a UE is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive a Discontinuous Reception (DRX) configuration from a Base Station (BS), the DRX configuration including a first DRX timer and a second DRX timer; receive a first Hybrid Automatic Repeat Request (HARQ) configuration from the BS, the first HARQ configuration indicating a first state of a first HARQ process; receive a second HARQ configuration from the BS, the second HARQ configuration indicating a second state of a second HARQ process; perform a Downlink (DL) transmission using the first HARQ process; determine whether to start the first DRX timer for the first HARQ process after the DL transmission based on the first state indicated by the first HARQ configuration; and determine whether to start the second DRX timer for the second HARQ process after the UL transmission based on the second state indicated by the second HARQ configuration.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
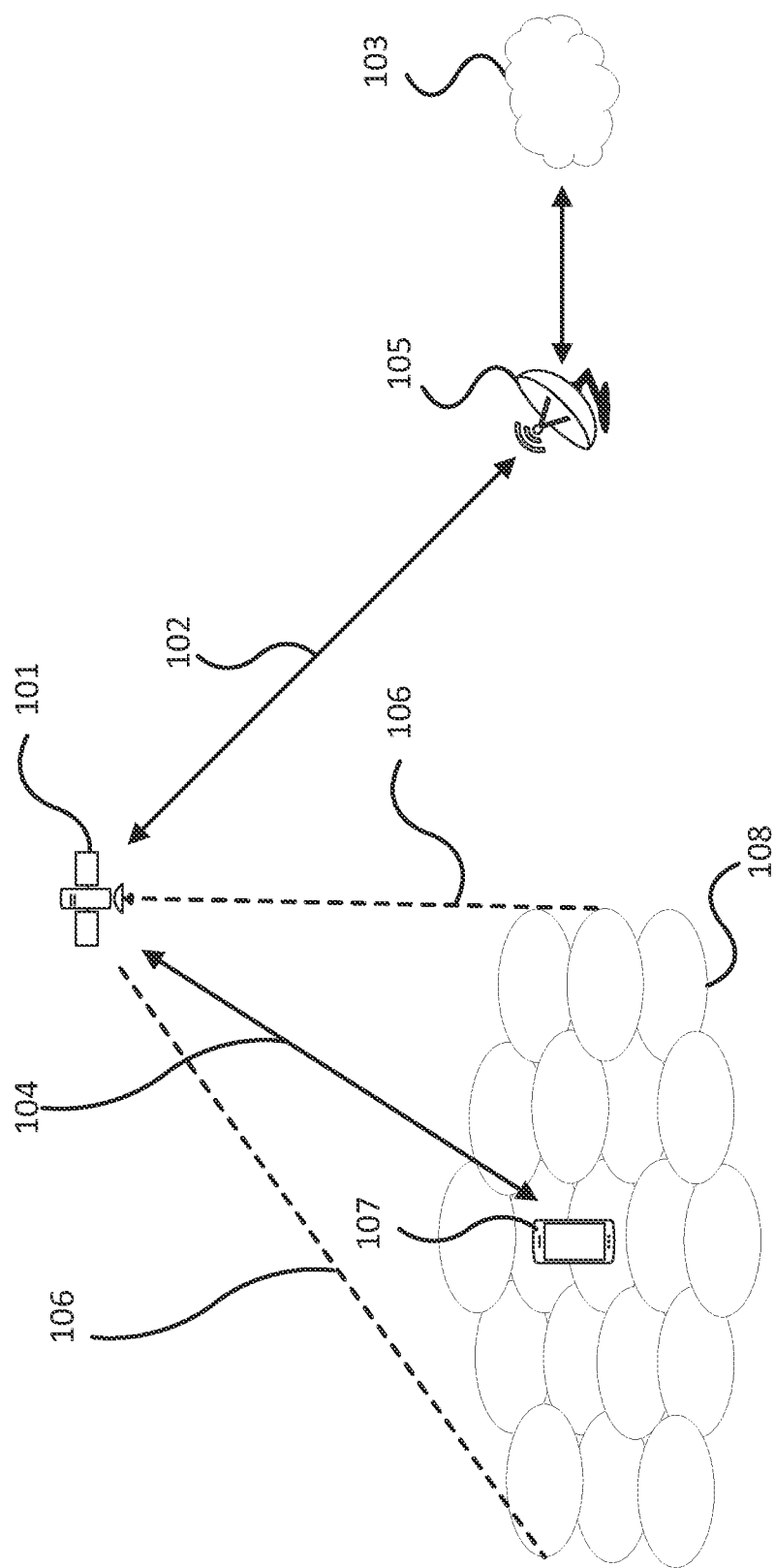
FIG. 1 is a schematic diagram illustrating a non-terrestrial network (NTN) that provides access to a user equipment (UE) according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

Uplink Scheduling: In the uplink, the gNB may dynamically allocate resources to UEs via the Cell-Radio Network Temporary Identifier (C-RNTI) on PDCCH(s). A UE may monitor the PDCCH(s) in order to find possible grants for uplink transmission when its downlink reception is enabled (activity governed by DRX when configured). When Carrier Aggregation (CA) is configured, the same C-RNTI may apply to all serving cells. The UE may be configured with up to 12 active configured uplink grants for a given Bandwidth Part (BWP) of a serving cell. When more than one is configured, the network may decide which of these configured uplink grants are active at a time (including all of them). Each configured uplink grant may either be of Type 1 or Type 2. For Type 2, activation and deactivation of configured uplink grants may be independent among the serving cells. When more than one Type 2 configured grant is configured, each configured grant may be activated separately using a Downlink Control Information (DCI) command and deactivation of Type 2 configured grants may be done using a DCI command, which can either deactivate a single configured grant configuration or multiple configured grant configurations jointly.

Non-Terrestrial Network (NTN): An NTN may refer to a network, or segment of networks using Radio Frequency (RF) resources on board a satellite (or Unmanned Aircraft System (UAS) platform). A Non-Terrestrial Network typically may feature the following elements.

One or several satellite gateways (sat-gateways) that connect the NTN to a public data network. A Geostationary Earth Orbit (GEO) satellite may be fed by one or several sat-gateways which are deployed across the satellite targeted coverage (e.g., regional or even continental coverage). A UE in a cell may be served by only one sat-gateway. A Non-GEO satellite may be served successively by one or several sat-gateways at a time. The system may ensure service and feeder link continuity between the successive serving sat-gateways with sufficient time duration to proceed with mobility anchoring and handover. A feeder link or radio link may be provided between a sat-gateway and the satellite (or UAS platform). A service link or radio link may be provided between the user equipment and the satellite (or UAS platform). A satellite (or UAS platform) which may implement either a transparent or a regenerative (with onboard processing) payload. The satellite (or UAS platform) may generate several beams over a given service area bounded by its field of view. The footprints of the beams may be typically of elliptic shape. The field of view of a satellite (or UAS platform) may depend on the onboard antenna diagram and minimum elevation angle.

Transparent payload: Radio Frequency filtering, Frequency conversion and amplification. The waveform signal repeated by the payload may be unchanged.

Regenerative payload: Radio Frequency filtering, Frequency conversion and amplification as well as demodulation/decoding, switching and/or routing, coding/modulation. This may be effectively equivalent to having all or part of the functions of a base station (e.g., gNB) onboard the satellite (or UAS platform).

Inter-satellite links (ISL) optionally in case of a constellation of satellites. This may require regenerative payloads onboard the satellites. ISL may operate in RF frequency or optical bands. The UE may be served by the satellite (or UAS platform) within the targeted service area.

User Equipment (UE): The UE may be referred to as a Physical (PHY)/Medium Access Control (MAC)/Radio Link Control (RLC)/Packet Data Convergence Protocol (PDCP)/Service Data Adaptation Protocol (SDAP) entity. The PHY/MAC/RLC/PDCP/SDAP entity may be referred to as the UE.

Network (NW): The NW may be a network node, a Transmission Reception Point (TRP), a cell (e.g., Special Cell (SpCell), Primary Cell (PCell), Primary Secondary Cell (PSCell), and/or Secondary Cell (SCell)), an eNB, a gNB, a core network, and/or a base station.

Serving Cell: A SpCell, a PCell, a PSCell, or an SCell. The serving cell may be an activated or a deactivated serving cell.

Special Cell (SpCell): For Dual Connectivity (DC) operation, the SpCell may refer to the PCell of the Master Cell Group (MCG) or the PSCell of the Secondary Cell Group (SCG) depending on if the MAC entity is associated to the MCG or the SCG, respectively. Otherwise, the SpCell may refer to the PCell. A SpCell may support Physical Uplink Control Channel (PUCCH) transmission and contention-based Random Access (RA) and may be always activated.

Configured Grant (CG): The gNB may allocate/configure uplink resources for the initial HARQ transmissions and/or the HARQ retransmissions to UEs. Two types of configured uplink grants may be provided. With CG type 1, RRC/gNB may directly provide the configured uplink grant (e.g., including the periodicity). With CG type 2, RRC/gNB may define the periodicity of the configured uplink grant while the Physical Downlink Control Channel (PDCCH) addressed to Configured Scheduling-Radio Network Temporary Identifier (CS-RNTI) can either activate the configured uplink grant, and/or deactivate it (e.g., a PDCCH addressed to CS-RNTI may indicate that the uplink grant is implicitly used according to the periodicity defined by RRC/gNB, until deactivated).

Dynamic Grant (DG): The gNB can dynamically allocate UL resources to UEs via the C-RNTI on PDCCH.

Random Access Response (RAR) grant: A UL grant may be provided via Message 2 (Msg2)/RAR and/or Message B (MsgB) during the 4-step/2-step Random Access (RA) procedure. The UL grant may be included in MAC payload for RAR and/or MsgB (e.g., MAC RAR and/or fallback RAR). The UL grant may be provided by an Uplink Grant field that indicates the resources to be used on the UL channel (e.g., PUSCH). The size of the UL Grant field may be but is not limited to 27 bits. The UL transmission based on the RAR grant may be transmitted via Message 3 (Msg3).

Message A (MsgA): MsgA may include a Physical Random Access Channel (PRACH) preamble and a Physical Uplink Shared Channel (PUSCH) transmission, known as MsgA PRACH and MsgA PUSCH, respectively. MsgA may be transmitted during a 2-step RA procedure.

MsgA PRACH: The MsgA PRACH preambles may be separated from the 4-step Random Access Channel (RACH) preambles but may be transmitted in the same PRACH Occasions (ROs) as the preambles of 4-step RACH, or in separate ROs.

MsgAPUSCH: The PUSCH transmissions may be organized into PUSCH Occasions (POs) which may span multiple symbols and Physical Resource Blocks (PRBs) with optional guard periods and guard bands between consecutive POs. Each PO may include multiple Demodulation Reference Signal (DMRS) ports and/or DMRS sequences, with each DMRS port/DMRS sequence pair known as PUSCH resource unit (PRU). 2-step RA procedure may support at least one-to-one and multiple-to-one mapping between the preambles and PRUs.

FIG. 1 is a schematic diagram illustrating a non-terrestrial network (NTN) that provides access to a user equipment (UE) 107 according to an example implementation of the present disclosure. As illustrated in FIG. 1, a satellite (or UAS platform) 101 may be connected to a data network 103 based on a sat-gateway 105. A feeder link (or radio link) 102 may be provided between the sat-gateway 105 and the satellite (or UAS platform) 101. A service link (or radio link) 104 may be provided between a UE 107 and the satellite (or UAS platform) 101. The satellite (or UAS platform) 101 may implement a transparent payload. The satellite (or UAS platform) may generate several beams over a given service area bounded by its field of view 106. The footprints of the beams 108 may be typically of elliptic shape. The field of view 106 of the satellite (or UAS platform) 101 may depend on the onboard antenna diagram and minimum elevation angle. The UE 107 may be served by the satellite (or UAS platform) 101 within the targeted service area.

Figure 2:
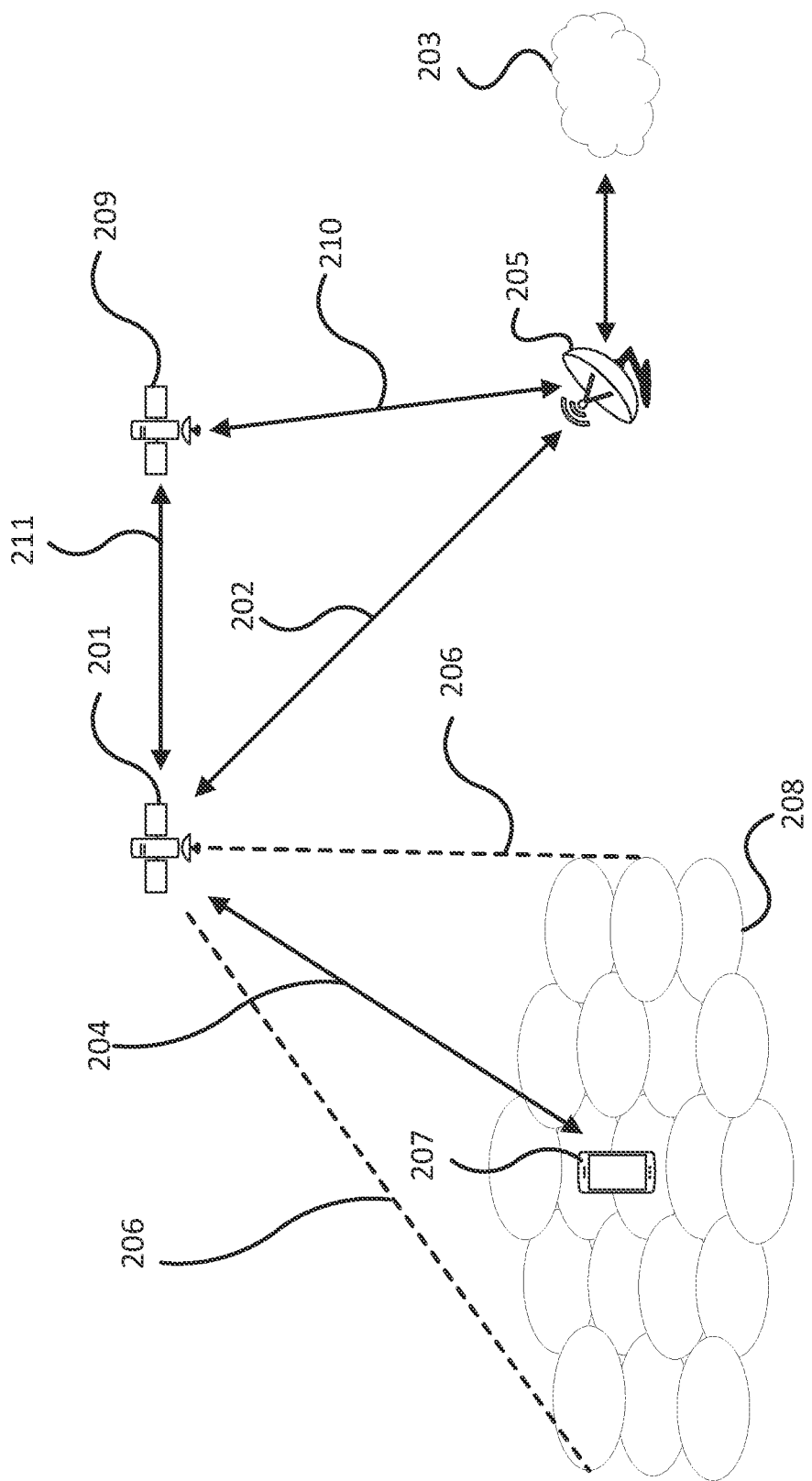
FIG. 2 is a schematic diagram illustrating an NTN that provides access to a UE according to another example implementation of the present disclosure.

FIG. 2 is a schematic diagram illustrating an NTN that provides access to a UE 207 according to another example implementation of the present disclosure. As illustrated in FIG. 2, a first satellite (or UAS platform) 201 and a second satellite (or UAS platform) 209 may be connected to a data network 203 based on a sat-gateway 205. A first feeder link (or radio link) 202 may be provided between the sat-gateway 205 and the first satellite (or UAS platform) 201. A second feeder link (or radio link) 210 may be provided between the sat-gateway 205 and the second satellite (or UAS platform) 209. A service link (or radio link) 204 may be provided between a UE 207 and the first satellite (or UAS platform) 201. Each of the first satellite (or UAS platform) 201 and the second satellite (or UAS platform) 209 may implement a regenerative payload. The satellite (or UAS platform) may generate several beams over a given service area bounded by its field of view 206. The footprints of the beams 208 may be typically of elliptic shape. The field of view 206 of the first satellite (or UAS platform) 201 may depend on the onboard antenna diagram and minimum elevation angle. The UE 207 may be served by the satellite (or UAS platform) 201 within the targeted service area. ISL 211 may be provided between the first satellite (or UAS platform) 201 and the second satellite (or UAS platform) 209. If the ISL 211 is provided, it may be required the regenerative payloads onboard the first satellite (or UAS platform) 201 and the second satellite (or UAS platform) 209. ISL 211 may operate in RF frequency or optical bands. If the ISL 211 is not provided, the first feeder link (or radio link) 202 may be mandatory.

Table 1 below includes an example of different types of satellites (or UAS platforms).

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | Above 35786 km | Notional station keeping position | 200-3500 km |
| UAS platform (including High Altitude Platform Station (HAPS)) | 8-50 km (20 km HAPS) | fixed in terms of elevation/azimuth with respect to a given earth point | 5-200 km |
| High Elliptical Orbit (HEO) satellite | 400-50000 km | Elliptical around the earth | 200-3500 km |

The NTN may also include an Air-to-Ground (ATG) network that refers to in-flight connectivity techniques, using ground-based cell towers that send signals up to an aircraft's antenna(s) of an onboard ATG terminal. As a plane (or aircraft) travels into different sections of airspace, the onboard ATG terminal may automatically connect to the cell with the strongest received signal power, just as a mobile phone does on the ground. An ATG gNB may be deployed on the ground, with antennas pointing upward to form an aerial cell, while an aircraft performs as a special UE. An ATG air interface may connect ATG gNB and aircraft, while Wi-Fi may connect the aircraft and the passenger's devices.

There are several regional commercial or trial in-flight networks based on hybrid techniques of ATG and satellite communication, such as Gogo's commercial network in the USA, Inmarsat's commercial network in Europe, and CMCC's trail network in China. Regarding the hybrid network, a satellite link may focus on providing "everywhere" connectivity (e.g., when crossing the sea), while an ATG link focuses on providing high-quality data services for all service available areas (e.g., inland and coastline area).

Figure 3:
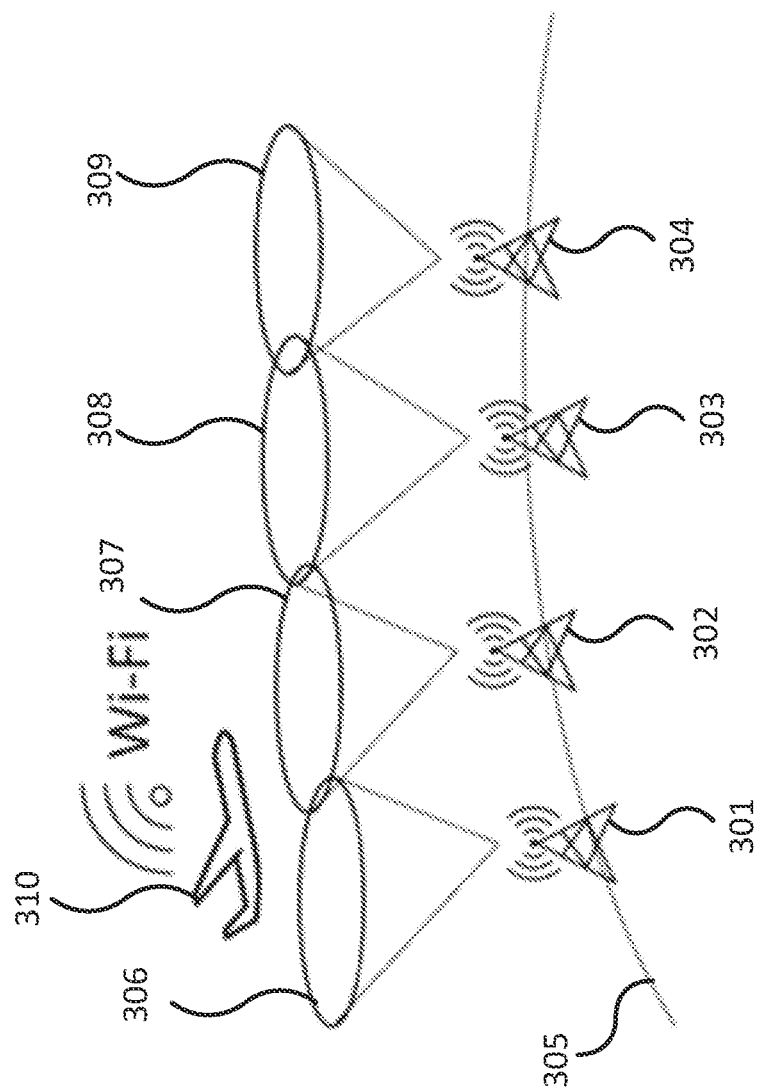
FIG. 3 is a schematic diagram illustrating an Air-to-Ground (ATG) network according to an example implementation of the present disclosure.

Similar to the satellites described in FIG. 1 and FIG. 2, the ATG may handle an extremely large cell coverage range (e.g., up to 300 km) and high speed (e.g., up to 1200 km/h) as well. FIG. 3 is a schematic diagram illustrating an ATG network according to an example implementation of the present disclosure. Each ATG gNB 301 to 304 deployed on the ground 305 may be provided with antennas pointing upward to form aerial cells 306 to 309, and an aircraft 310 may perform as a special UE. An ATG air interface may connect ATG gNBs 301 to 304 and the aircraft 310, while Wi-Fi may connect the aircraft 310 and the passenger's devices.

The (MAC sublayer of) UE may support error correction and/or repetition through Hybrid Automatic Repeat Request (HARQ). The HARQ functionality may ensure delivery between peer entities at Layer 1 (e.g., physical layer).

For the NTN, the network may disable HARQ feedback for downlink (DL) transmission at the UE receiver, e.g., to cope with long propagation delays. Even if the HARQ feedback is disabled, the HARQ processes may be still configured. Enabling/disabling of the HARQ feedback may be a network decision signaled semi-statically to the UE by Radio Resource Control (RRC) signaling. The enabling/disabling of the HARQ feedback for downlink transmission may be configurable on a per UE and/or per HARQ process basis via RRC signaling.

For the NTN, the network may disable HARQ retransmission for uplink transmission at the UE transmitter. Even if the HARQ retransmissions are disabled, the HARQ processes may be still configured. The enabling/disabling of the HARQ retransmission for uplink (UL) transmission may be configured per UE, per HARQ process and/or per logical channel (LCH) basis.

Multiple transmissions of the same Transport Block (TB) in a bundle (e.g., MAC schedules packets in a bundle with pdsch-AggregationFactor>1 in downlink and/or pusch AggregationFactor>1 in the uplink) may be possible and may be useful to lower the residual Block Error Rate (BLER), particularly in case HARQ feedback and/or HARQ retransmission is disabled. Soft combining of multiple transmissions may be supported in the receiver of the UE. Multiple transmissions of the same TB (e.g., MAC schedules the same TB on the same HARQ process without the New Data Indicator (NDI) being toggled) are possible and may also be useful to lower the residual BLER, particularly in case the HARQ feedback and/or HARQ retransmission is disabled.

If the HARQ feedback and/or the HARQ retransmission is disabled for a selective number (e.g., not all) of HARQ processes, the configured parameters/Information Elements (IEs) for different HARQ processes may be different.

In the NTN, the HARQ process(es) for DL transmission and/or the HARQ process(es) for UL transmission may be disabled/enabled, by NW configuration and/or UE itself. In some implementations, the HARQ process(es) for DL and/or the HARQ process(es) for UL may be disabled/enabled per UE. In some implementations, the HARQ process(es) for DL and/or the HARQ process(es) for UL may be disabled/enabled per HARQ process.

For per UE basis, in a DL aspect, all the (configured) HARQ processes (of the UE) for DL transmission may be disabled/enabled at the same time, e.g., when receiving the NW configuration for disabling/enabling the HARQ process (es). In a UL aspect, all the (configured) HARQ processes (of the UE) for UL transmission may be disabled/enabled at the same time, e.g., when receiving the NW configuration for disabling/enabling the HARQ process(es).

For per HARQ process basis, in a DL aspect, one or multiple of the HARQ process(es) for DL transmission may be disabled/enabled, e.g., based on configuration. For example, assuming that a UE has 16 HARQ processes for DL transmission, HARQ processes 0 to 3 for DL transmission may be enabled, while HARQ processes 4 to 15 for DL transmission may be disabled. In a UL aspect, one or multiple HARQ process(es) for UL transmission may be disabled/enabled, e.g., based on configuration. For example, assuming that a UE has 16 HARQ processes for UL transmission, HARQ processes 0 to 3 for UL transmission may be enabled, while HARQ processes 4 to 15 for UL transmission may be disabled.

I. Operations for HARQ

For a DL transmission/reception based on a DL assignment which is transmitted via a disabled HARQ process (e.g., a HARQ process without HARQ feedback), some specific UE behaviors may need to be performed, e.g., when/after receiving an indication (e.g., RRC configuration) to disable the HARQ feedback of a HARQ process which is used for the DL transmission/reception. For a UL transmission based on a UL grant (e.g., CG, DG, RAR grant, MsgA PUSCH) which is transmitted via a disabled HARQ process (e.g., a HARQ process without HARQ retransmission), some specific UE behaviors may need to be performed, e.g., when/after receiving an indication (e.g., RRC configuration) to disable the HARQ retransmission of a HARQ process which is used for the UL transmission. The UE may receive one or more of the following (RRC) configurations to indicate the states of the HARQ process from the network (NW).

The states of HARQ feedback for a HARQ process (for DL) are described as follows:

First state of HARQ feedback for a HARQ process (for DL): Enable HARQ feedback for a HARQ process(es). HARQ feedback (Acknowledgement (ACK)/Negative Acknowledgement (NACK)) for a HARQ process may be enabled by the NW. The UE may need to send the HARQ feedback (ACK/NACK) for a HARQ process if the HARQ feedback for the HARQ process is enabled. The UE may (re)start a DRX timer (e.g., drx-HARQ-RTT-TimerDL) for the HARQ process if the HARQ feedback for the HARQ process is enabled.

Second state of HARQ feedback for a HARQ process (for DL): Disable HARQ feedback for a HARQ process (es). HARQ feedback (ACK/NACK) for a HARQ process may be disabled by the NW. The UE may not send the HARQ feedback (ACK/NACK) for a HARQ process if the HARQ feedback for the HARQ process is disabled. The UE may not (re)start a DRX timer (e.g., drx-HARQ-RTT-TimerDL) for the HARQ process if the HARQ feedback for the HARQ process is disabled.

The states of HARQ retransmission for a HARQ process (for UL) are described as follows:

First state of HARQ retransmission for a HARQ process (for UL): Enable HARQ retransmission for a HARQ process(es). HARQ retransmission for a HARQ process may be enabled by the NW. The UE may (re)start a DRX timer (e.g., drx-HARQ-RTT-TimerUL) for the HARQ process if the HARQ retransmission for the HARQ process is enabled. The UE may extend the length of a DRX timer (e.g., drx-HARQ-RTT-TimerUL), e.g., by UE-gNB RTT, if the HARQ retransmission for the HARQ process is enabled.

Second state of HARQ retransmission for a HARQ process (for UL): Disable HARQ retransmission for a HARQ process(es). The UE may not (re)start a DRX timer (e.g., drx-HARQ-RTT-TimerUL) for the HARQ process if the HARQ retransmission for the HARQ process is disabled. The UE may not extend the length of a DRX timer (e.g., drx-HARQ-RTT-TimerUL), e.g., by UE-gNB RTT, if the HARQ retransmission for the HARQ process is disabled.

In some implementations, the UE may consider whether an NDI bit for a HARQ process to have been toggled (e.g., regardless of the value of the NDI) based on the state of the HARQ process (e.g., whether HARQ feedback and/or HARQ retransmission for the HARQ process) is enabled/disabled.

For a DL and/or UL transmission (e.g., via CG, DG, RAR grant, MsgA PUSCH) transmitted via a disabled HARQ process, the UE may consider the NDI bit to have been toggled (regardless of the value of the NDI) for the HARQ process with a second state (e.g., disabled HARQ process). The UE may only expect/assume that a DL/UL resource for new transmission for a HARQ process with a second state (e.g., disabled HARQ process) would be scheduled by the NW. The UE may not expect/assume that a DL/UL resource for retransmission for a HARQ process with a second state (e.g., disabled HARQ process) would be scheduled by the NW. For a DL and/or UL transmission transmitted via a HARQ process with a second state (e.g., disabled HARQ process), the UE may ignore the NDI bit (regardless of the value of the NDI) for the HARQ process with a second state (e.g., disabled HARQ process). For a UL transmission via CG (e.g., if an uplink grant has been received on the PDCCH for the HE/MAC entity's CS-RNTI) with a disabled HARQ process, the UE may consider the NDI bit to have been toggled (regardless of the value of the NDI and/or no matter whether a configuredgrantTimer/cg-RetransmissionTimer is running or not) for the transmission associated with the HARQ process with a second state (e.g., disabled HARQ process). More specifically, considering the NDI bit to have been toggled for a DL/UL transmission may imply that the DL/UL transmission is a new transmission. Considering the NDI bit to not have been toggled (e.g., the value of the NDI bit is the same as before) for a DL/UL transmission may imply that the transmission is a DL/UL retransmission.

Table 2 below includes an example for a UL grant that the UE may consider whether an NDI bit for the HARQ process to have been toggled (regardless of the value of the NDI) based on determining whether a HARQ process (e.g., for HARQ retransmission) is enabled/disabled.

TABLE 2

Example:
If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:
    1> if an uplink grant for this Serving Cell has been received on the PDCCH for the MAC entity's C-RNTI or Temporary C-RNTI; or
    1> if an uplink grant has been received in a Random Access Response:
        2> if, for the corresponding HARQ process, HARQ retransmission of the HARQ process is a second state (e.g., disabled):
            3> consider the NDI to have been toggled for the corresponding HARQ process (regardless of the value of the NDI).
        2> deliver the uplink grant and the associated HARQ information to the HARQ entity.
    1> else if an uplink grant for this PDCCH occasion has been received for this Serving Cell on the PDCCH for the MAC entity's CS-RNTI:
        2> if the NDI in the received HARQ information is 1:
            3> if, for the corresponding HARQ process, HARQ retransmission of the HARQ process is a second state (e.g., disabled):
                4> consider the NDI to have been toggled for the corresponding HARQ process (regardless of the value of the NDI).
            3> else consider the NDI for the corresponding HARQ process not to have been toggled (i.e., for the corresponding HARQ process, HARQ retransmission is not disabled);
        2> else if the NDI in the received HARQ information is 0:

Table 3 below includes an example for a CG that the HE may consider whether an NDI bit for the HARQ process to have been toggled (regardless of the value of the NDI) based on determining whether a HARQ process (e.g., for HARQ retransmission) is enabled/disabled.

TABLE 3

Example:
For each Serving Cell and each configured uplink grant, if configured and activated, the MAC entity shall:
    1> if the PUSCH duration of the configured uplink grant does not overlap with the PUSCH duration of an uplink grant received on the PDCCH or in a Random Access Response for this Serving Cell or with the PUSCH duration of an MSGA payload:
        2> set the HARQ Process ID to the HARQ Process ID associated with this PUSCH duration
        2> if, for the corresponding HARQ process, HARQ retransmission of the HARQ process is a second state (e.g., disabled):
            3> consider the NDI bit for the corresponding HARQ process to have been toggled (regardless of the value of the NDI and/or no matter whether a configuredgrantTimer/cg-Retransmission Timer is running or not)
            3> deliver the configured uplink grant and the associated HARQ information to the HARQ entity.
        2> else (i.e., for the corresponding HARQ process, HARQ retransmission is not disabled)

In the present disclosure, some operations on MAC timers may be provided. For CG, the UE may receive the configurations/IEs for the following timers from the network (NW).

configuredgrantTimer: the configuredgrantTimer may indicate the initial value of the configured grant timer (as specified in the 3GPP Technical Specification (TS) 38.321) in multiples of periodicity. When cg-RetransmissonTimer is configured, if HARQ processes are shared among different configured grants on the same BWP, configuredgrantTimer may be set to the same value for all of the configurations on this BWP.

cg-RetransmissionTimer: the cg-RetransmissionTimer may indicate the initial value of the configured retransmission timer (as specified in the 3GPP TS 38.321) in multiples of periodicity. The value of cg-RetransmissionTimer may be less than the value of configuredgrantTimer. This field may be configured for operation with shared spectrum channel access together with harq-ProcID-Offset. This field may not be configured for operation in the licensed spectrum or simultaneously with harq-ProcID-Offset2.

Table 4 below includes an example of the CG timer, the CG retransmission timer, and the corresponding functionalities.

drx-RetransmissionTimerUL (per UL HARQ process): the drx-RetransmissionTimerUL may indicate a maximum duration until a grant for UL retransmission is received.

drx-HARQ-RTT-TimerDL (per DL HARQ process except for the broadcast process): the drx-HARQ-RTT-TimerDL may indicate a minimum duration before a DL assignment for HARQ retransmission is expected by the MAC entity.

drx-HARQ-RTT-TimerUL (per UL HARQ process): the drx-HARQ-RTT-TimerUL may indicate a minimum duration before a UL HARQ retransmission grant is expected by the MAC entity The configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL may be impacted if the HARQ feedback and/or the HARQ retransmission of the corresponding HARQ process (es) is disabled.

In some implementations, assuming a UL transmission via CG is transmitted via a HARQ process (e.g., the HARQ process (ID) has been derived for the CG transmission), a UE may stop the configuredGrantTimer, cg-RetransmissionTimer, drx-RetransmissionTimerDL, drx-Retransmission-

TABLE 4

| configuredGrantTimer (performed per HARQ process) | cg-RetransmissionTimer (performed per HARQ process) |
|---|---|
| - tart or restart the configuredGrantTimer when:<br>  - a new transmission or retransmission using a HARQ process indicated by CG/DG is performed, and the used HARQ process is configured for CG<br>- Stop the configuredGrantTimer when<br>  - CG type 2 activation<br>  - ACK is received for that HARQ process<br>- While the configuredGrantTimer is running:<br>  - The UE could not use the corresponding HARQ process for new transmission via CG | - Start or restart the cg-RetransmissionTimer when:<br>  - a new transmission or retransmission of CG via a HARQ process is performed, and the HARQ process is configured for CG<br>- Stop the cg-RetransmissionTimer when<br>  - a new transmission of DG via a HARQ process is performed, and the HARQ process is configured for CG<br>  - ACK or NACK is received for that HARQ process<br>  - configuredGrantTimer expires for that HARQ process<br>  -CG type 2 activation<br>  - CG type 2 activation<br>- While the cg-RetransmissionTimer is running:<br>  - The UE could not use the HARQ process for CG autonomously retransmission |

The UE/MAC entity may be configured by RRC or NW with a Discontinuous Reception (DRX) functionality that controls the UE's PDCCH monitoring activity for the HE/MAC entity's C-RNTI, Cancellation Indication (CI)-RNTI, CS-RNTI, Interruption (INT)-RNTI, Slot Format Indication (SFI)-RNTI, Semipersistent (SP)-Channel State Information (CSI)-RNTI, Transmit Power Control (TPC)-PUCCH-RNTI, TPC-PUSCH-RNTI, TPC-Sounding Reference Signal (SRS)-RNTI, and/or Availability Indication (AI)-RNTI. When in RRC_CONNECTED, if DRX is configured, for all the activated Serving Cells, the UE/MAC entity may monitor the PDCCH discontinuously based on the DRX operation.

For DRX operation, the UE may be configured with the following timers from the NW.

drx-RetransmissionTimerDL (per DL HARQ process except for the broadcast process): the drx-RetransmissionTimerDL may indicate a maximum duration until a DL retransmission is received.

TimerUL, drx-HARQ RTT-TimerDL, and/or drx-HARQ-RTT-TimerUL (for the HARQ process) when/after the UE receives the second state (e.g., disabling of HARQ feedback/HARQ retransmission) for the UE (e.g., via an RRC message) or the UE receives the second state (e.g., disabling of HARQ feedback/HARQ retransmission) for the HARQ process (e.g., via an RRC message).

For example, when/after the UE receives the second state (e.g., disabling of HARQ retransmission) for a HE, the UE may stop all the configuredGrantTimer, cg-RetransmissionTimer, drx-RetransmissionTimerDL, drx-RetransmissionTimerUL, drx-HARQ-RTT-TimerDL, and/or drx-HARQ RTT-TimerUL (e.g., for all HARQ processes). For example, when/after the UE receives the second state (e.g., disabling of HARQ retransmission) for a HARQ process, the UE may stop a configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for the HARQ process).

In some implementations, assuming a UL transmission via CG is transmitted via a HARQ process (e.g., the HARQ process (ID) has been derived for the CG transmission), a UE may consider the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) as expired/not valid when/after the UE receives the second state (e.g., disabling of HARQ feedback/HARQ retransmission) for the UE (e.g., via an RRC message) or the UE receives the second state (e.g., disabling of HARQ feedback/HARQ retransmission) for the HARQ process (e.g., via an RRC message).

For example, when/after the UE receives second state (e.g., the disabling of HARQ retransmission) for the UE, the UE may consider all the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for all HARQ processes) as expired/not valid. For example, when/after the UE receives the second state (e.g., disabling of HARQ retransmission) for a HARQ process, the UE may consider a configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for the HARQ process) as expired/not valid.

In some implementations, assuming a UL transmission via CG is transmitted via a HARQ process (e.g., the HARQ process (ID) has been derived for the CG transmission), the UE may not (re-)start the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) based on the following conditions:

When/after the UE receives the second state (e.g., disabling of HARQ feedback/HARQ retransmission) for the HE, the UE may not (re-)start all the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for all HARQ processes).

When/after the UE receives the second state (e.g., disabling of HARQ feedback/HARQ retransmission) for a HARQ process, the UE may not (re-)start the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for the HARQ process).

In some implementations, assuming a UL transmission via CG is transmitted via a HARQ process (e.g., the HARQ process (ID) has been derived for the CG transmission), the UE may ignore (or not apply) the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) based on the following conditions:

When/after the UE receives the second state (e.g., disabling of HARQ feedback/HARQ retransmission) for the UE (e.g., via an RRC message). For example, when/after the UE receives the second state (e.g., disabling of HARQ retransmission) for the HE, the UE may ignore (or not apply) all the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for all HARQ processes).

When/after the UE receives the second state (e.g., disabling of HARQ feedback/HARQ retransmission) for the HARQ process (e.g., via an RRC message). For example, when/after the UE receives the second state (e.g., disabling of HARQ retransmission) for a HARQ process, the UE may ignore (or not apply) a configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (e.g., for the HARQ process).

In some implementations, the NW may not configure the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) when the NW configures the second state (e.g., disabling of HARQ feedback/HARQ retransmission) for the UE or the NW configures the disabling of HARQ feedback/HARQ retransmission for the HARQ process (and/or the HARQ process could be used for CG transmission).

For example, the NW may not configure the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for all HARQ process for a UE) when the NW configures the second state (e.g., disabling of HARQ retransmission) for the HE. For example, the NW may not configure the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) when the NW configures the second state (e.g., disabling of HARQ retransmission) for the HARQ process.

In some implementations, the NW may set the value of the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) as 0 (zero) based on the following conditions:

When the NW configures the second state (e.g., disabling of HARQ feedback/HARQ retransmission) for the HE. For example, the NW may set the value of the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for all HARQ process for a UE) as 0 when the NW configures the second state (e.g., disabling of HARQ retransmission) for the UE.

When the NW configures the second state (e.g., disabling of HARQ feedback/HARQ retransmission) for the HARQ process (and/or the HARQ process could be used for CG transmission). For example, the NW may set the value of the configuredGrantTimer, cg-RetransmissionTimer, drx-RetransmissionTimerDL, drx-RetransmissionTimerUL, drx-HARQ-RTT-TimerDL, and/or drx-HARQ-RTT-TimerUL (for a HARQ process) as 0 when the NW configures the second state (e.g., disabling of HARQ retransmission) for the HARQ process.

Table 5 below includes an example that when/after a UE receives the second state (e.g., disabling of HARQ retransmission) for a HARQ process, the UE may stop a configuredGrantTimer and cg-RetransmissionTimer for the HARQ process.

TABLE 5

Example:
For each Serving Cell and each configured uplink grant, if configured and activated, the MAC entity shall:
1> if the PUSCH duration of the configured uplink grant does not overlap with the PUSCH duration of an uplink grant received on the PDCCH or in a Random Access Response for this Serving Cell or with the PUSCH duration of an MSGA payload:
    2> set the HARQ Process ID to the HARQ Process ID associated with this PUSCH duration
    2> if, for the corresponding HARQ process, HARQ retransmission is a second state (e.g., disabled):
        3> stop the configuredGrantTimer, if running
        3> stop the cg-RetransmissionTimer, if running In some implementations, a configuredGrantTimer may be configured (e.g., from NW) with an initial value "0". In this circumstance, UE may consider the configuredGrantTimer as not running, and/or may consider the corresponding HARQ process as not pending.

In some implementations, upon the UE receives an RRC message that provides a parameter to disable HARQ retransmission of a HARQ process and/or to indicate the second state of a second HARQ process, the UE may deactivate, suspend, and/or release a configured grant associated with the HARQ process that has activated before receiving the RRC message for disabling UL retransmission for the given HARQ process, if the configured grant is configured and activated.

In some implementations, upon the UE receiving an RRC message that provides a parameter to disable UL retransmission of a HARQ process and/or to indicate the second state of a second HARQ process, the UE may stop the configuredGrantTimer (if running), if a configured grant is configured and activated.

In some implementations, if a configured grant is associated with at least one HARQ process that has been disabled on HARQ transmission via an RRC message from the NW, the UE may disable all HARQ retransmission for HARQ processes associated with the configured grant. In this case, the HARQ process identity may be derived by the UE with an ascending order given a range of identities provided by the NW, e.g., 3, 4, 5, 3, 4, 5, and so on, or might be provided by the NW with a repeating pattern without any continuity in numbers, e.g., 3, 9, 7, 3, 9, 7, and so on.

In some implementations, for the PUSCH retransmission scheduled by a PDCCH associated with a HARQ process ID with Cyclic Redundancy Check (CRC) scrambled by CS-RNTI with NDI=1 (i.e., CG retransmission), if the HARQ process ID is associated with HARQ retransmission disabling, the UE may ignore the PDCCH and may not transmit the corresponding PUSCH retransmission.

To perform the UL transmissions, the MAC layer may receive HARQ information from lower layers. An uplink grant addressed to CS-RNTI with NDI=0 may be considered a configured uplink grant. An uplink grant addressed to CS-RNTI with NDI=1 may be considered a dynamic uplink grant.

In the present disclosure, some operations on a HARQ buffer may be provided. If a UE and/or a HARQ process of the UE has been configured as a disabled HARQ process (for HARQ feedback or for HARQ retransmission). The disabled HARQ process may support or not support the retransmission/repetition. If the disabled HARQ supports the retransmission/repetition, the NW may schedule the retransmission grant for the HARQ process (even if there is no HARQ feedback/HARQ retransmission), which may be referred to as blind-retransmission. However, if the disabled HARQ process does not support the retransmission (e.g., the UE could not use the disabled HARQ process to perform retransmission), some behaviors may be needed.

In some implementations, the UE may flush a HARQ buffer of a HARQ process based on the following conditions:

When/after the HARQ feedback and/or HARQ retransmission of the HARQ process is disabled (and/or indicated as the second state). For example, when/after the UE receives the disabling of HARQ feedback/HARQ retransmission for the UE, the UE may flush all HARQ buffer. For example, when/after the UE receives the disabling of HARQ feedback/HARQ retransmission for a HARQ process, the UE may flush a HARQ buffer of the HARQ process. More specifically, the UE may flush the HARQ buffer when/after a (new) transmission is transmitted (successfully) on the associated HARQ process.

When/after the HARQ feedback and/or HARQ retransmission of the HARQ process does not support (blind) retransmission. For example, when/after the UE receives an indication that all HARQ processes do not support (blind) retransmission, the UE may flush all HARQ buffers. For example, when/after the UE receives an indication that a HARQ process does not support (blind) retransmission, the UE may flush a HARQ buffer of the HARQ process. More specifically, the UE may flush the HARQ buffer when/after a (new) transmission is transmitted (successfully) on the associated HARQ process.

II. LCH and/or MAC CE Mapping to a HARQ Process

In MAC layer, to perform multiplexing and assembly procedures for generating a MAC Protocol Data Unit (PDU) for (UL) transmission, the UE may perform a Logical Channel Prioritization (LCP), which includes a selection of an LCH and allocation of resources. Furthermore, the UE may perform multiplexing of MAC Control Elements (MAC CEs) and MAC Service Data Units (SDUs) to a MAC PDU.

In LCP, when a new transmission is performed (e.g., based on CG, DG, RAR grant, and/or MsgA PUSCH), the UE may select the logical channels for each UL grant that satisfy (all) the following conditions (note that the parameters/IEs for the conditions may be configured in LogicalChannelConfig, which means the parameters may be configured on a per-LCH basis):

The set of allowed Subcarrier Spacing index values in allowedSCS-List, if configured, includes the Subcarrier Spacing index associated to the UL grant.

maxPUSCH-Duration, if configured, is greater than or equal to the PUSCH transmission duration associated to the UL grant.

configuredGrantType1Allowed, if configured, is set to true in case the UL grant is a Configured Grant Type 1.

allowedServingCells, if configured, includes the Cell information associated with the UL grant. Does not apply to logical channels associated with a Data Radio Bearer (DRB) configured with PDCP duplication within the same MAC entity (i.e., CA duplication) for which PDCP duplication is deactivated.

allowedCG-List, if configured, includes the configured grant index associated with the UL grant; and allowedPHY-PriorityIndex, if configured, includes the priority index (as specified in the 3GPP TS 38.213) associated to the dynamic UL grant.

In allocation of resources, when a new transmission is performed, the UE may allocate resources to the logical channels selected based on LCP (for each UL grant that satisfy (all) the following conditions mentioned in the present disclosure). Additionally, data from LCHs (e.g., MAC SDU) and/or MAC CEs may be prioritized in accordance with the following order.

C-RNTI MAC CE or data from UL-Common Control Channel (CCCH)

Configured Grant Confirmation MAC CE or Beam Failure Recovery (BFR) MAC CE or Multiple Entry Configured Grant Confirmation MAC CE Sidelink Configured Grant Confirmation MAC CE Listen Before Talk (LBT) failure MAC CE MAC CE for Sidelink-Buffer Status Report (SL-BSR) prioritized MAC CE for BSR, with exception of BSR included for padding Single Entry Power Headroom Report (PHR) MAC CE or Multiple Entry PHR MAC CE MAC CE for the number of Desired Guard Symbols MAC CE for Pre-emptive BSR MAC CE for SL-BSR, with exception of SL-BSR prioritized and SL-BSR included for padding Data from any Logical Channel, except data from UL-CCCH MAC CE for Recommended bit rate query MAC CE for BSR included for padding MAC CE for SL-BSR included for padding Prioritization among Configured Grant Confirmation MAC CE, Multiple Entry Configured Grant Confirmation MAC CE, and BFR MAC CE may be up to UE implementation.

How to map a data from an LCH to a UL grant could be controlled by LCP restriction/operation (e.g., based on the parameters/IEs configured by NW for LCP conditions to select the LCHs). How to map a MAC CE to a UL grant may follow the priority order as mentioned in the present disclosure.

For UL transmission, when there is a new transmission based on a UL grant, the UE may select the LCH(s) (based on LCP) and multiplex the data from the selected LCH(s) to the UL grant. If the UL grant is a configured grant (CG), the UE may select/derive a HARQ process (ID) to perform the new transmission based on a formula. If the UL grant is a DG, the NW may indicate which HARQ process (ID) should be used for the new transmission, e.g., via a DCI field to (explicitly) indicate the HARQ process ID. When there is a UL grant (e.g., CG and/or DG), the UE may use a HARQ process for the UL transmission based on the UL grant. However, which data (e.g., from which LCH(s)) may be multiplexed in the MAC PDU for the UL transmission may be based on LCP conditions. That is, it is possible that data from one or more than one LCH(s) may be multiplexed into a MAC PDU and may be transmitted via a UL resource using a specific HARQ process.

It is noted that the data from different LCHs may be associated with different requirements (e.g., Quality of Service (QoS) requirements). Also, the priorities of transmission for different LCHs may be different. For example, the data from some LCHs may need higher reliability. It is beneficial to multiplex data from LCHs which need higher reliability to a UL transmission via the HARQ process(es) with an enabled HARQ process (i.e., the HARQ process is enabled HARQ retransmission), and multiplex data from LCHs which may not need higher reliability to a UL transmission via the HARQ process(es) with a disabled HARQ process (i.e., the HARQ process is disabled HARQ retransmission).

How to map a MAC CE to a UL transmission may follow the priority order as mentioned in the present disclosure. However, some important MAC CEs may include important information, e.g., C-RNTI MAC CE or data from UL-CCCH, Configured Grant Confirmation MAC CE, BFR MAC CE, and/or LBT failure MAC CE, etc. The reliability of the transmission of the MAC PDU which includes these MAC CE(s) may be critical. Therefore, it may be beneficial to multiplex some important MAC CE(s) to a UL transmission via the HARQ process(es) with an enabled HARQ process (i.e., the HARQ process is enabled HARQ retransmission).

In some implementations, an indication (e.g., indicated/configured by the NW) may be used to indicate whether a specific LCH(s) and/or MAC CE(s) is allowed to be selected for a (new) transmission using a specific HARQ process based on a state of the HARQ process (e.g., whether HARQ retransmission is enabled/disabled for the HARQ process). The UE may select one or multiple LCH(s) and/or MAC CE(s) for the UL transmission using the specific HARQ process based on the indication/configuration.

If the UL grant is a DG, the UE may know the UL transmission based on the DG could be transmitted via which HARQ process (e.g., based on a DCI field of the DG). The UE may select one or more LCH(s) and/or MAC CE(s) to allocate the resource of the DG based on the state, the indication and/or the information of the HARQ process (e.g., HARQ process ID/list and/or whether the HARQ retransmission is enabled/disabled). If the UL grant is a CG, the UE may derive/select a HARQ process ID based on a formula for the transmission of the CG. The UE may select one or more LCH(s) and/or MAC CE(s) to allocate the resource of the CG based on the state, the indication and/or the information of the HARQ process (e.g., HARQ process ID/list and/or whether the HARQ retransmission is enabled/disabled). If the UL grant is a RAR grant, the HARQ process ID for the transmission of the RAR grant may be a specific HARQ process (e.g., HARQ process 0). The UE may select one or more LCH(s) and/or MAC CE(s) to allocate the resource of the RAR grant based on the indication to determine whether the LCH(s) and/or MAC CE(s) could be selected for the specific HARQ process (e.g., HARQ process 0 and/or with a first state/a second state).

The indication may be a list (e.g., allowedHARQ-List) to include the HARQ process ID(s). The indication may indicate whether one or multiple HARQ process(es) (which is used for transmission of the UL grant) could be used for a specific LCH and/or MAC CE(s) based on a state of the HARQ process. The indication may include the HARQ process information (e.g., HARQ process IDs). For example, the indication may include HARQ process 1 and HARQ process 2 for an LCH(s) and/or MAC CE(s). When the UE performs a (new) transmission based on a UL grant, the UE may (only) select the indicated LCH(s) and/or MAC CE(s) to allocate the resource of the UL grant if the transmission based on the UL grant is transmitted via HARQ process 1 and/or HARQ process 2. The UE may not select the LCH(s) and/or MAC CE(s) to allocate the resource of the UL grant if the transmission based on the UL grant is transmitted via HARQ process 3. For example, if the indication (e.g., the list) is configured for an LCH and none of the HARQ process ID(s) are disabled, UL data from this LCH may be mapped to a UL resource (of a CG or DG) that corresponds to any HARQ process ID. More specifically, the UE may ignore the indication if the UE is not configured with disabled HARQ process.

The indication may be a flag (e.g., allowedHARQenable and/or allowedHARQdisable) to indicate whether the LCH(s) and/or MAC CE(s) is allowed to be associated to a HARQ process based on a state of the HARQ process (e.g., whether the HARQ retransmission for the HARQ process is enabled/disabled). If the indication indicates the LCH(s) and/or MAC CE(s) is allowed to be mapped to a first state of HARQ process (e.g., with enabled HARQ retransmission), the UE may select this LCH(s) and/or MAC CE(s) for the UL transmission via a HARQ process with the first state (e.g., with enabled HARQ retransmission). If the indication indicates the LCH(s) and/or MAC CE(s) is allowed to be mapped to a second state of a HARQ process (e.g., with disabled HARQ retransmission), the UE may select this LCH(s) and/or MAC CE(s) for the UL grant which is transmitted via a HARQ process with the second state (e.g., with disabled HARQ retransmission). If the indication indicates the LCH(s) and/or MAC CE(s) is allowed to be mapped to a HARQ process with the first state and the second state, the UE may select this LCH(s) and/or MAC CE(s) for the UL transmission via a HARQ process with the first state or a HARQ process with the second state.

The indication may indicate one of two values (e.g., 0/1, allowed/disallowed, and/or enable/disable). If the indication indicates a first value (e.g., 0, allowed, and/or enable) for an LCH(s) and/or MAC CE(s), when the UE performs a (new) transmission based on a UL grant, the UE may select the LCH(s) and/or MAC CE(s) for the UL transmission via a HARQ process with a first state (e.g., with enabled HARQ retransmission). The UE may not select the LCH(s) and/or MAC CE(s) for the UL transmission via a HARQ process with a second state (e.g., with disabled HARQ retransmission). If the indication indicates a second value (e.g., 1, disallowed, and/or disabled) for an LCH(s) and/or MAC CE(s), when the UE performs a (new) transmission based on a UL grant, the UE may select the LCH(s) and/or MAC CE(s) for the UL transmission via a HARQ process with a second state (e.g., with disabled HARQ retransmission). The UE may not select the LCH(s) and/or MAC CE(s) for the UL transmission via a HARQ process with a first state (e.g., with enabled HARQ retransmission). The indication (e.g., a flag) may be configured for an LCH to associate the LCH to (a set of) disabled HARQ(s) process. UL data from this LCH may be mapped to a UL resource with any HARQ process ID in the case that the state of the HARQ process is not configured and/or none of the HARQ process ID(s) are disabled). More specifically, the UE may ignore the indication if the UE is not configured with disabled HARQ process and/or if the UE is not configured with the state of the HARQ process.

The indication may be a threshold (e.g., to indicate a value) for the selection of LCH and/or MAC CE for a UL transmission using a HARQ process. The LCH(s) ID and/or MAC CE (and/or its priority index) which is higher or less than the threshold may be selected for a (new) transmission (based on a UL grant) which is transmitted via a specific HARQ process with a first state (e.g., enabled HARQ retransmission) and/or a second state (e.g., disabled HARQ retransmission). The priority index may be based on an IE priority configured in LogicalChannelConfig. The priority (index) may be configured per LCH and/or MAC CE. The priority may be used for comparison of the priority between LCHs and MAC CEs. For example, assuming that the indication indicates a threshold/value, when the UE performs a (new) transmission based on a UL grant, the UE may (only) select the LCH and/or MAC CE whose ID and/or priority (index) is greater than the indicated threshold/value for a UL transmission via a HARQ process with a first state (e.g., enabled HARQ retransmission). The UE may not select the LCH and/or MAC CE whose ID and/or priority (index) is less than the indicated threshold/value for the UL transmission via a HARQ process with a second state (e.g., disabled HARQ retransmission).

The indication may indicate one or more LCHs and/or MAC CEs (e.g., via a list) that may be selected for a (new) transmission of a UL transmission via a specific HARQ process (ID) with a first state (e.g., enabled HARQ retransmission) and/or a second state (e.g., disabled HARQ retransmission). The indication may include LCH ID(s). The indication may indicate one or more kinds of MAC CE(s). For example, assuming that the indication indicates LCH 1 and LCH 2 and/or indicates that the LCH 1 and LCH 2 are allowed to be mapped to a HARQ process with a first state (e.g., enabled HARQ retransmission), when the UE performs a (new) transmission for a UL transmission, the UE may select the LCH 1 and/or LCH 2 to allocate the resource of the UL transmission for the HARQ process with the first state. The UE may not select the LCH 3 to allocate the resource for the UL transmission for the HARQ process with the first state. For example, assuming that the indication indicates a first MAC CE and a second MAC CE are allowed to be mapped to a HARQ process with a first state (e.g., enabled HARQ retransmission), when the UE performs a (new) transmission for a UL transmission, the UE may select the first MAC CE and the second MAC CE to allocate the resource of the UL transmission for the HARQ process with the first state. The UE may not select the third MAC CE to allocate the resource for the UL transmission for the HARQ process with the first state.

In some implementations, one or more, or all, LCH(s) and/or MAC CEs may (only) be allowed to be transmitted on a UL transmission via a specific HARQ process (ID) with a first state (e.g., with enabled HARQ retransmission). One or more, or all, LCH(s) and/or MAC CEs may (only) be allowed to be transmitted via a specific HARQ process with a first state (e.g., a specific HARQ process with enabled HARQ retransmission, and/or the specific HARQ process is HARQ process 0). One or more, or all, LCH(s) and/or MAC CEs may (only) be allowed to be transmitted via a UL transmission scheduled by a specific UL grant (e.g., CG, DG, RAR grant, and/or MsgA PUSCH).

In some implementations, data from UL-CCCH may (only) be mapped to a HARQ process with a first state (e.g., with enabled HARQ retransmission). Data from UL-CCCH may not be mapped to a HARQ process with a second state (e.g., with disabled HARQ retransmission). In some implementations, a specific HARQ process (e.g., the HARQ process 0) may be configured as a HARQ process with a first state (e.g., with enabled HARQ retransmission). The specific HARQ process (e.g., the HARQ process 0) may not be configured as a HARQ process with a second state (e.g., with disabled HARQ retransmission). The specific HARQ process (e.g., the HARQ process 0) may not be allowed to disable its HARQ retransmission or set as the second state.

The indication may be configured by a configuration included in LogicalChannelConfig. The indication may be a parameter/IE for LCP. The indication may be configured by a configuration for the NTN. The indication may be configured per LCH, per HARQ process, per Bandwidth Part (BWP), per serving cell, and/or per HE. The indication may be configured by the NW. The indication may be configured when the UE is operated in the NTN. The parameter/IE may be configured when at least one HARQ process has had its HARQ feedback and/or HARQ retransmission disabled. The parameter/IE may not be configured when all the HARQ process have had its HARQ feedback and/or HARQ retransmission enabled. The indication may be configured if the HARQ process has had its HARQ feedback and/or HARQ retransmission enabled/disabled on a per HARQ basis. The indication may be applied for a UL transmission scheduled by a specific UL grant (e.g., DG and/or CG). The indication may not be applied for a UL transmission scheduled by a specific UL grant (e.g., RAR grant and/or MsgA PUSCH).

The MAC CE(s) mentioned in the present disclosure may refer to one or more of the following MAC CE(s):

C-RNTI MAC CE or data from UL-CCCH
Configured Grant Confirmation MAC CE or BFR MAC CE or Multiple Entry Configured Grant Confirmation MAC CE
Sidelink Configured Grant Confirmation MAC CE
LBT failure MAC CE
MAC CE for SL-BSR prioritized
MAC CE for BSR, with exception of BSR included for padding
Single Entry PHR MAC CE or Multiple Entry PHR MAC CE
MAC CE for the number of Desired Guard Symbols
MAC CE for Pre-emptive BSR
MAC CE for SL-BSR, with exception of SL-BSR prioritized and SL-BSR included for padding
Data from any Logical Channel, except data from UL-CCCH
MAC CE for Recommended bit rate query
MAC CE for BSR included for padding
MAC CE for SL-BSR included for padding

III. HARQ Process ID Selection for CG and/or SPS

The HARQ process ID used for UL CG transmission and/or DL Semi-Persistent Scheduling (SPS) reception may be derived/selected based on an equation without an offset, an equation with an offset, or HE implementation to select a HARQ Process ID among the HARQ process IDs available for the configured grant configuration.

The HARQ Process ID for UL CG may be provided in the following. For configured uplink grants neither configured with harq-ProcID-Offset2 nor with cg-Retransmission-Timer, the HARQ Process ID associated with the first symbol of a UL transmission may be derived from the following equation:

HARQ Process ID=[floor(CURRENT_symbol/periodicity)]modulo nrofHARQ-Processes

For configured uplink grants with harq-ProcID-Offset, the HARQ Process ID associated with the first symbol of a UL transmission may be derived from the following equation:

HARQ Process ID=[floor(CURRENT_symbol/periodicity)]modulo nrofHARQ-Processes+harq-ProcID-Offset2, Where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in the 3GPP TS 38.211. Also, SFN refers to the System Frame Number.

For configured uplink grants configured with cg-RetransmissionTimer, the UE implementation selects a HARQ Process ID among the HARQ process IDs available for the configured grant configuration. The UE may prioritize retransmissions before initial transmissions. The UE may toggle the NDI in the CG-Uplink Control Information (UCI) for new transmissions and may not toggle the NDI in the CG-UCI in retransmissions.

The HARQ Process ID for DL SPS may be provided in the following. For configured downlink assignments without harq-ProcID-Offset, the HARQ Process ID associated with the slot where the DL transmission starts may be derived from the following equation:

HARQ Process ID=[floor(CURRENT_slot×10/(numberOfSlotsPerFrame×periodicity))]modulo nrofHARQ Processes, Where CURRENT_slot=[(SFN×numberOfSlotsPerFrame)+slot number in the frame] and numberOfSlotsPerFrame refers to the number of consecutive slots per frame as specified in the 3GPP TS 38.211.

For configured downlink assignments with harq-ProcID-Offset, the HARQ Process ID associated with the slot where the DL transmission starts may be derived from the following equation:

HARQ Process ID=[floor(CURRENT_slot/periodicity)]modulo nrofHARQ Processes+harq-ProcID-Offset, Where CURRENT_slot=[(SFN×numberOfSlotsPerFrame)+slot number in the frame] and numberOfSlotsPerFrame refers to the number of consecutive slots per frame as specified in the 3GPP TS 38.211.

Assuming that the HARQ feedback/HARQ retransmission for some of the HARQ processes are disabled and the HARQ feedback/HARQ retransmission for the other HARQ processes are enabled, there may be problems if the HARQ process ID for CG/SPS transmission is also derived based on the formula as specified in the 3GPP TS 38.321. For example, for a CG/SPS configuration, it may not be guaranteed that each transmission via the resource configured by the CG/SPS configuration is transmitted via a UL/DL HARQ process ID with enabled or disabled HARQ feedback/HARQ retransmission. In a case that the UE needs to derive a HARQ process ID for an SPS/CG transmission, the UE may derive a HARQ process ID for which HARQ feedback/HARQ retransmission is enabled/disabled for the SPS/CG transmission.

In some implementations, a parameter/IE (e.g., a flag) may be configured by the NW to indicate whether the SPS/CG configuration is allowed to be mapped to a HARQ process with enabled and/or disabled HARQ feedback/HARQ retransmission. For example, the UE may be configured with a HARQ process 0 to 3 (e.g., the first set/group of HARQ processes) with enabled HARQ feedback/HARQ retransmission and HARQ process 4 to 15 (e.g., the second set/group of HARQ processes) with disabled HARQ feedback/HARQ retransmission. The UE may be configured with an SPS/CG configuration. If the parameter/IE indicates that the SPS/CG configuration is allowed to be mapped to a HARQ process with enabled HARQ feedback/HARQ retransmission, the UE may select the HARQ process ID 0 to 3 (e.g., the first set of HARQ processes) to perform the SPS/CG transmission for the SPS/CG configuration. If the parameter/IE indicates that the SPS/CG configuration is not allowed to be mapped to a HARQ process with disabled HARQ feedback/HARQ retransmission, the UE may use the HARQ process ID 4 to 15 (e.g., the second set of HARQ processes) to perform the SPS/CG transmission for the SPS/CG configuration. If the parameter/IE indicates that the SPS/CG configuration is allowed to be mapped to a HARQ process with both enabled and disabled HARQ feedback/HARQ retransmission (or if there is no restriction or if the parameter/IE is not configured), the UE may use all of the HARQ process IDs to perform the SPS/CG transmission for the SPS/CG configuration. If the parameter is not configured, the UE may select any of the HARQ process IDs (e.g., by UE implementation), select the HARQ process IDs based on a formula, and/or select a default HARQ process ID (e.g., configured by the NW).

In some implementations, a parameter/IE (e.g., a list) may be configured by the NW to indicate whether a HARQ process or a set of HARQ processes supports SPS/CG transmission. For example, the UE may be configured with HARQ processes 0 to 3 (e.g., the first set/group of HARQ processes) with enabled HARQ feedback/HARQ retransmission and HARQ processes 4 to 15 (e.g., the second set of HARQ processes) with disabled HARQ feedback/HARQ retransmission. The UE may be configured with an SPS/CG configuration. If the parameter/IE indicates a HARQ process or a set of HARQ processes supports SPS/CG transmission, the UE may select/derive the HARQ process ID for the SPS/CG transmission from the HARQ process or the set of HARQ processes to perform the SPS/CG transmission. The UE may not select the HARQ process ID(s) and/or another set of HARQ processes which does not support SPS/CG transmission to perform the SPS/CG transmission. If the parameter/IE is not configured, the UE may select any of the HARQ process IDs (e.g., by UE implementation), select the HARQ process IDs based on a formula, and/or select a default HARQ process ID (e.g., configured by the NW).

In some implementations, a parameter/IE (e.g., an offset and/or a threshold) may be configured by the NW to be used for (the formula of) the HARQ process ID derivation for SPS/CG. For example, the parameter/IE may indicate a value, and the UE may select/derive the HARQ process ID which is equal to or greater than the value to be used for SPS/CG transmission. Otherwise, the UE may select/derive the HARQ process ID which is equal to or less than the value to be used for SPS/CG transmission. For example, the parameter/IE may be used for a new formula for HARQ process ID derivation for SPS/CG. The parameter may not be the harq-ProcID-O set and/or harq-ProcID-Offset2 as specified in the 3GPP TS 38.321.

The new formula may be provided as follows:

HARQ Process ID=[floor(CURRENT_symbol/periodicity)]modulo(nrofHARQ-Processes+/−a value indicated by the parameter/IE), or HARQ Process ID=[floor(CURRENT_symbol/periodicity)]modulo a value indicated by the parameter/IE In some circumstances (e.g., for the NTN), the formula for HARQ process ID derivation for SPS/CG (e.g., as specified in the 3GPP TS 38.321) may not be applied. The UE may apply the method for HARQ process ID derivation described in the present disclosure. If the UE operates in the NTN, the formula for HARQ process ID derivation for SPS/CG may not be applied. The UE may apply the method for HARQ process ID derivation described in the present disclosure. If the UE connects with an NTN beam, cell, and/or BS, the formula for HARQ process ID derivation for SPS/CG may not be applied. The UE may apply the method for HARQ process ID derivation described in the present disclosure. If the UE reports a capability for NTN, the formula for HARQ process ID derivation for SPS/CG may not be applied. The UE may apply the method for HARQ process ID derivation described in the present disclosure. If the UE has a HARQ process(s) which HARQ feedback/HARQ retransmission is disabled, the formula for HARQ process ID derivation for SPS/CG may not be applied. The UE may apply the method for HARQ process ID derivation described in the present disclosure. If the UE is configured with the parameter/IE mentioned in the present disclosure, the formula for HARQ process ID derivation for SPS/CG may not be applied. The UE may apply the method for HARQ process ID derivation described in the present disclosure.

The parameter may be used to indicate whether the SPS/CG configuration is allowed to be mapped to a HARQ process with enabled and/or disabled HARQ feedback/HARQ retransmission. The parameter may be used to indicate whether a HARQ process or a set of HARQ processes supports SPS/CG transmission The parameter may be an offset and/or a threshold used for (the formula of) the HARQ process ID derivation for SPS/CG.

Assuming that a CG is configured to support HARQ process(es) with enabled/disabled HARQ feedback/HARQ retransmission (e.g., the CG transmission may be transmitted using a HARQ process with enabled/disabled HARQ feedback/HARQ retransmission). If there is a (UL) data (e.g., MAC PDU, TB) to be transmitted, the UE may determine whether to use the CG associated with the HARQ process(es) with enabled/disabled HARQ feedback/HARQ retransmission based on some criteria. If the UE determines not to use the CG for transmitting the data, the UE may skip the CG transmission.

The UE may determine whether to use the CG associated with the HARQ process(es) with enabled/disabled HARQ feedback/HARQ retransmission based on the content included in the data. The content may be a specific RRC message, a specific MAC CE, and/or etc. If the data includes a specific RRC message and/or a specific MAC CE, the UE may select a HARQ process ID which is enabled for HARQ feedback/HARQ retransmission. If the data does not include a specific RRC message and/or a specific MAC CE, the UE may select a HARQ process ID which is disabled for HARQ feedback/HARQ retransmission.

In some implementations, the UE may determine whether to use the CG associated with the HARQ process(es) with enabled/disabled HARQ retransmission based on the LCH/Data Radio Bearer (DRB)/Signaling Radio Bearer (SRB) from which the data comes. For example, if the data comes from a first LCH/DRB/SRB, the UE may select a HARQ process ID which is enabled for HARQ retransmission to transmit the data from the first LCH/DRB/SRB. If the data comes from a second LCH/DRB/SRB, the UE may select a HARQ process ID which is disabled for HARQ retransmission to transmit the data from the second LCH/DRB/SRB. How to map/associate the LCH/DRB/SRB to the HARQ process may be configured by the NW.

How to select the HARQ process ID from a set of HARQ processes with enabled/disabled HARQ feedback/HARQ retransmission may be based on the time occasion (e.g., symbol, slot) for the SPS/CG transmission, based on periodicity (of the SPS/CG), and/or based on a number of HARQ processes of the set. How to select the HARQ process ID from a set of HARQ processes with enabled/disabled HARQ feedback/HARQ retransmission may be based on UE implementation. If at least one HARQ process ID has had its HARQ feedback/HARQ retransmission disabled at a UE, an HARQ ID for each UL resource that corresponds to a CG configuration may be selected based on UE implementation. The UE may select an enabled/disabled HARQ ID. The parameter/IE may be configured in an SPS/CG configuration.

The parameter/IE may be a flag (e.g., 1 bit). A first value (e.g., 0) of the flag may indicate the SPS/CG configuration is allowed to be mapped to a HARQ process with enabled HARQ feedback/HARQ retransmission. A second value (e.g., 1) of the flag may indicate the SPS/CG configuration is allowed to be mapped to a HARQ process with disabled HARQ feedback/HARQ retransmission. If a specific parameter/IE has been configured for a CG configuration, a HARQ ID for each UL resource that corresponds to this CG configuration may be selected based on UE implementation. In some implementations, if a flag indicates a CG is allowed to be mapped to a HARQ process with enabled HARQ feedback/HARQ retransmission, a HARQ ID for each UL resource that corresponds to this CG configuration may be selected based on UE implementation. If a flag indicates a CG is allowed to be mapped to a HARQ process with enabled HARQ feedback/HARQ retransmission, the UE may only select a HARQ process ID with enabled HARQ feedback/HARQ retransmission. In some implementations, if a flag indicates a CG is allowed to be mapped to a HARQ process with disabled HARQ feedback/HARQ retransmission, a HARQ ID for each UL resource that corresponds to this CG configuration may be selected based on UE implementation. If a flag indicates a CG is allowed to be mapped to a HARQ process with enabled HARQ feedback/HARQ retransmission, the UE may only select a HARQ process ID with disabled HARQ feedback/HARQ retransmission. It may be noted that a UE may indicate (via UCI) the HARQ process ID of a UL resource that corresponds to a CG configuration if the UE selects the HARQ process ID of the UL resource by itself.

The set of HARQ processes may be configured by a list. The HARQ processes IDs in the set may be continuous or not continuous. The set of HARQ processes may be (or configured to be) available or not available for SPS/CG configuration. The HARQ process related to an enabled HARQ feedback/HARQ retransmission or related to a disabled HARQ feedback/HARQ retransmission may be configured by the NW. The parameter/IE may be configured when the UE is operated in the NTN. The parameter may be configured when at least one HARQ process for the UE is disabled for its HARQ feedback/HARQ retransmission. The parameter/IE may not be configured when all of the HARQ process are enabled for HARQ feedback/HARQ retransmission. A parameter/IE configured for SPS and a parameter/IE configured for CG may be the same (value) or different (values). The parameter/IE may be configured on a per LCH, per HARQ process, per UE, per BWP, and/or per cell basis. The parameter/IE configured for different SPS/CG configurations may be different (values). The parameter/IE may only be configured if the HARQ process has had its HARQ feedback/HARQ retransmission enabled/disabled on a per HARQ basis. The parameter/IE may not be configured if the HARQ process has had its HARQ feedback/HARQ retransmission enabled/disabled on a per UE basis. When the UE selects a HARQ process (ID) for CG transmission based on methods in the present disclosure, the UE may report/indicate the CG transmission using which HARQ process (ID) to the NW, e.g., by UCI.

Figure 4:
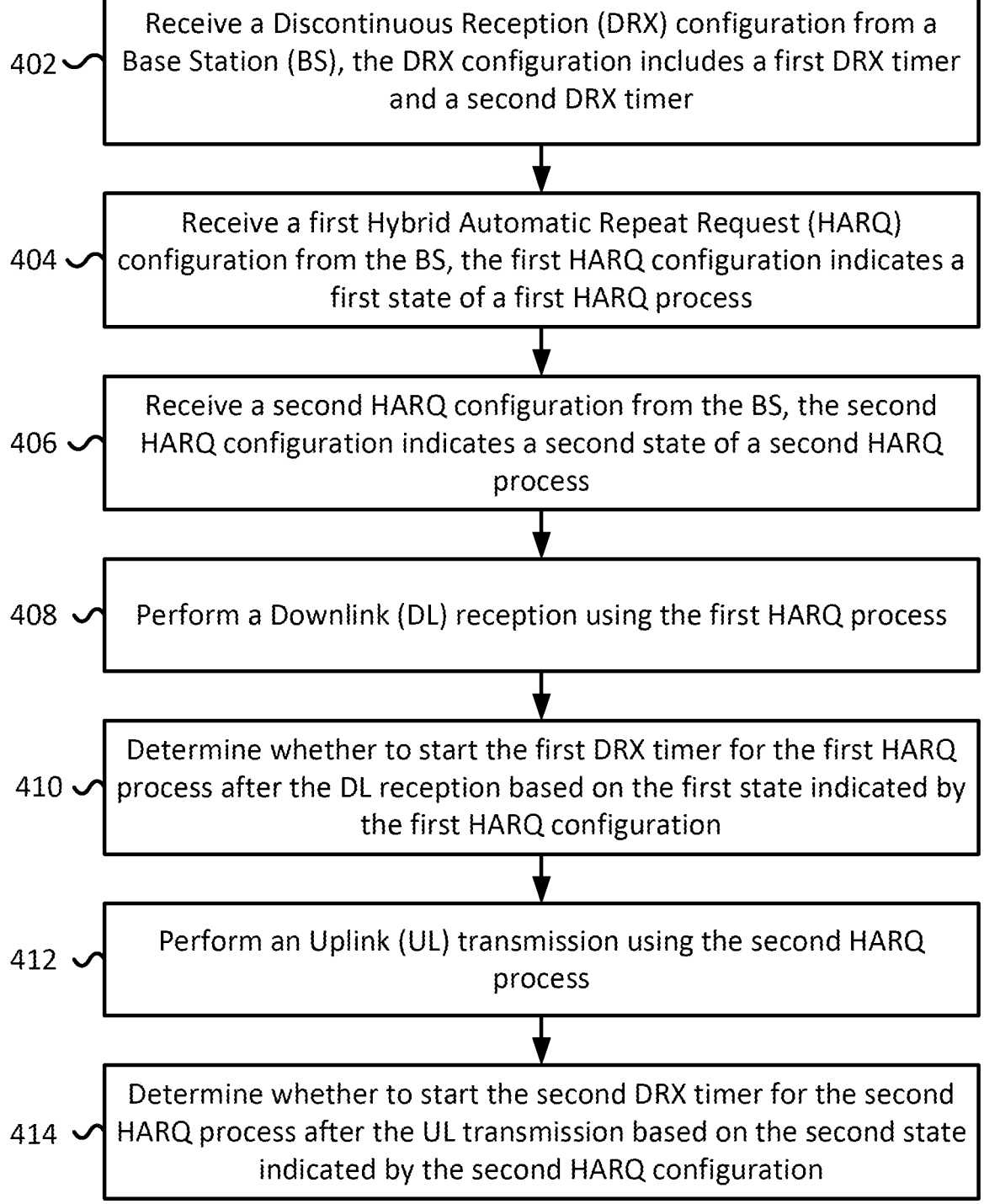
FIG. 4 is a flowchart illustrating a method performed by a UE for hybrid automatic repeat request (HARQ) process operation in an NTN according to an example implementation of the present disclosure.

FIG. 4 is a flowchart illustrating a method 400 performed by a UE for hybrid automatic repeat request (HARQ) process operation in a non-terrestrial network (NTN) according to an example implementation of the present disclosure. Although actions 402, 404, 406, 408, 410, 412 and 414 are illustrated as separate actions represented as independent blocks in FIG. 4, these separately illustrated actions should not be construed as necessarily order dependent. The order in which the actions are performed in FIG. 4 is not intended to be construed as a limitation, and any number of the disclosed blocks may be combined in any order to implement the method, or an alternate method. Moreover, each of actions 402, 404, 406, 408, 410, 412 and 414 may be performed independent of other actions and can be omitted in some implementations of the present disclosure.

In action 402, the UE may receive a Discontinuous Reception (DRX) configuration from a Base Station (BS). The DRX configuration may include a first DRX timer and a second DRX timer. The first DRX timer may be a DRX HARQ RTT timer for DL. The second DRX timer may be a DRX HARQ RU timer for UL. For example, the DRX HARQ RTT timer for DL may be drx-HARQ-RTT-TimerDL, and the DRX HARQ RTT timer for UL may be drx-HARQ-RTT-TimerDL.

In action 404, the UE may receive a first Hybrid Automatic Repeat Request (HARQ) configuration from the BS. The first HARQ configuration may indicate a first state of a first HARQ process. The first state may indicate whether HARQ feedback for the first HARQ process is disabled. The first HARQ configuration may be configured by a Radio Resource Control (RRC) message.

In action 406, the UE may receive a second HARQ configuration from the BS. The second HARQ configuration may indicate a second state of a second HARQ process. The second state may indicate whether HARQ retransmission for the second HARQ process is disabled. The second HARQ configuration may be configured by a Radio Resource Control (RRC) message.

In action 408, the UE may perform a Downlink (DL) reception using the first HARQ process. The DL reception may be scheduled by a Physical Downlink Control Channel (PDCCH) or configured by a configured DL assignment.

In action 410, the UE may determine whether to start the first DRX timer for the first HARQ process after the DL reception based on the first state indicated by the first HARQ configuration. In a case that the first state indicates that HARQ feedback for the first HARQ process is not disabled (or is enabled), the UE may start the first DRX timer for the first HARQ process after the DL reception. In a case that the first state indicates that HARQ feedback for the first HARQ process is disabled, the UE may not start the first DRX timer for the first HARQ process after the DL reception.

In action 412, the UE may perform an Uplink (UL) transmission using the second HARQ process. The UL transmission may be scheduled by a Physical Downlink Control Channel (PDCCH) or configured by a configured UL grant.

In action 414, the UE may determine whether to start the second DRX timer for the second HARQ process after the UL transmission based on the second state indicated by the second HARQ configuration. In a case that the second state indicates that HARQ retransmission for the second HARQ process is not disabled (or is enabled), the UE may start the second DRX timer for the second HARQ process after the UL transmission. In a case that the second state indicates that HARQ retransmission for the second HARQ process is disabled, the UE may not start the second DRX timer for the second HARQ process after the UL transmission.

The UE shall monitor PDCCH to receive the possible retransmission scheduling while a DRX retransmission timer is running. However, if the UE is configured, by the NW, a state for a HARQ process to indicate that the feedback/retransmission of the HARQ process is disabled and/or no retransmission chance, the UE may not have chance to receive the retransmission scheduling from the NW. The method 400 provided in the present disclosure could determine not to start a DRX timer (e.g., DRX RU timer and/or DRX retransmission timer) when the UE is configured a state for a HARQ process to indicate that the feedback/retransmission of a HARQ process is disabled and/or no retransmission chance, the UE can save significant power by not starting the DRX timer and not monitoring the PDCCH.

Figure 5:
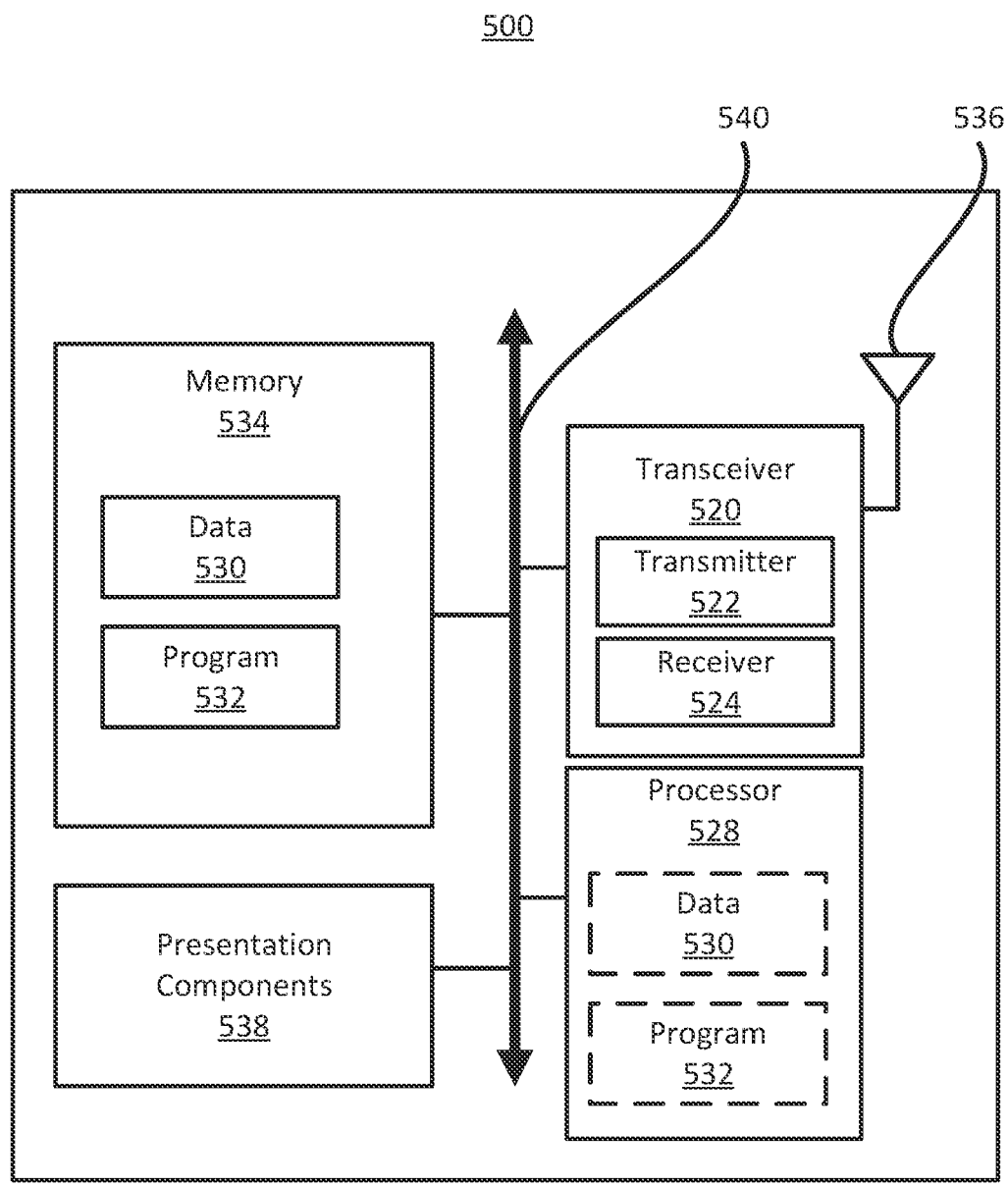
FIG. 5 is a block diagram illustrating a node for wireless communication according to an example implementation of the present disclosure.

FIG. 5 is a block diagram illustrating a node 500 for wireless communication according to an example implementation of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIG. 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including but not limited to usable, non-usable and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 534 may include computer-storage media in the form of volatile and/or non volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable program 532 (e.g., software codes) that are configured to, when executed, cause the processor 528 to perform various functions disclosed herein, for example, with reference to FIG. 4. Alternatively, the program 532 may not be directly executable by the processor 528 but may be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the program 532 received from the memory 534, and information transmitted and received via the transceiver 520, the base band communications module, and/or the network communications module. The processor 528 may also process information to send to the transceiver 520 for transmission via the antenna 536 to the network communications module for transmission to a CN.

One or more presentation components 538 may present data indications to a person or another device. Examples of presentation components 538 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE), the method comprising:
receiving a Discontinuous Reception (DRX) configuration from a Base Station (BS), the DRX configuration including a DRX Hybrid Automatic Repeat Request (HARQ) Round-Trip Time (RTT) timer for downlink (DL) for a first HARQ process and a DRX HARQ RTT timer for uplink (UL) for a second HARQ process;
receiving a first HARQ configuration from the BS, the first HARQ configuration indicating a first state of the first HARQ process, the first state indicating whether HARQ feedback for the first HARQ process is disabled;

receiving a second HARQ configuration from the BS, the second HARQ configuration indicating a second state of the second HARQ process, the second state indicating whether HARQ retransmission for the second HARQ process is disabled;

performing a DL reception using the first HARQ process, wherein the DL reception is configured by a configured DL assignment;

determining whether to start the DRX HARQ RTT timer for DL for the first HARQ process after the DL reception based on whether the HARQ feedback for the first HARQ process is disabled;

performing a UL transmission using the second HARQ process, wherein the UL transmission is configured by a configured UL grant; and determining whether to start the DRX HARQ RTT timer for UL for the second HARQ process after the UL transmission based on whether the HARQ retransmission for the second HARQ process is disabled.

2. The method of claim 1, further comprising:
starting the DRX HARQ RTT timer for DL for the first HARQ process after the DL reception in a case that the HARQ feedback for the first HARQ process is not disabled; and forgoing starting the DRX HARQ RTT timer for DL for the first HARQ process after the DL reception in a case that the HARQ feedback for the first HARQ process is disabled.

3. The method of claim 1, further comprising:
starting the DRX HARQ RTT timer for UL for the second HARQ process after the UL transmission in a case that the HARQ retransmission for the second HARQ process is not disabled; and forgoing starting the DRX HARQ RTT timer for UL for the second HARQ process after the UL transmission in a case that the HARQ retransmission for the second HARQ process is disabled.

4. The method of claim 1, wherein the first HARQ configuration and the second HARQ configuration are configured by a Radio Resource Control (RRC) message.

5. A user equipment (UE), comprising:
one or more non-transitory computer-readable media storing one or more computer-executable instructions; and at least one processor coupled to the one or more non-transitory computer-readable media, the at least one processor configured to execute the one or more computer-executable instructions to:

receive a Discontinuous Reception (DRX) configuration from a Base Station (BS), the DRX configuration including a DRX Hybrid Automatic Repeat Request (HARQ) Round-Trip Time (RTT) timer for downlink (DL) for a first-HARQ process and a DRX HARQ RTT timer for uplink (UL) for a second HARQ process;

receive a first HARQ configuration from the BS, the first HARQ configuration indicating a first state of the first HARQ process, the first state indicating whether HARQ feedback for the first HARQ process is disabled;

receive a second HARQ configuration from the BS, the second HARQ configuration indicating a second state of the second HARQ process, the second state indicating whether HARQ retransmission for the second HARQ process is disabled;

perform a DL reception using the first HARQ process, wherein the DL reception is configured by a configured DL assignment;

determine whether to start the DRX HARQ RU timer for DL for the first HARQ process after the DL reception based on whether the HARQ feedback for the first HARQ process is disabled;

perform a UL transmission using the second HARQ process, wherein the UL transmission is configured by a configured UL grant; and determine whether to start the DRX HARQ RU timer for UL for the second HARQ process after the UL transmission based on whether the HARQ retransmission for the second HARQ process is disabled.

6. The UE of claim 5, wherein the at least one processor is further configured to execute the one or more computer-executable instructions to:

start the DRX HARQ RU timer for DL for the first HARQ process after the DL reception in a case that the HARQ feedback for the first HARQ process is not disabled; and forgo starting the DRX HARQ RU timer for DL for the first HARQ process after the DL reception in a case that the HARQ feedback for the first HARQ process is disabled.

7. The UE of claim 5, wherein the at least one processor is further configured to execute the one or more computer-executable instructions to:

start the DRX HARQ RTT timer for UL for the second HARQ process after the UL transmission in a case that the HARQ retransmission for the second HARQ process is not disabled; and forgo starting the DRX HARQ RTT timer for UL for the second HARQ process after the UL transmission in a case that the HARQ retransmission for the second HARQ process is disabled.

8. The UE of claim 5, wherein the first HARQ configuration and the second HARQ configuration are configured by a Radio Resource Control (RRC) message.

* * * * *